United States Patent
Glover et al.

[11] 3,923,219
[45] Dec. 2, 1975

[54] VEHICLE ACCESSORY CARRIER FRAME

[76] Inventors: Clinton G. Glover, 2556 Linda Vista; Harold A. Keller, 2001 Linden, both of Clarkston, Wash. 99403

[22] Filed: Feb. 28, 1974

[21] Appl. No.: 446,598

[52] U.S. Cl...... 224/42.03 A; 224/42.44; 224/42.21
[51] Int. Cl.² ........................................... B60R 9/06
[58] Field of Search....... 224/42.03 A, 42.08, 42.44, 224/42.43, 42.03 R, 42.04, 42.07, 42.21, 42.45 R, 29 R; 214/450, 454

[56] References Cited
UNITED STATES PATENTS

| | | | |
|---|---|---|---|
| 2,146,642 | 2/1939 | Mueth | 224/42.08 X |
| 2,294,040 | 8/1942 | Metcalf | 224/42.03 R UX |
| 2,338,955 | 1/1944 | Metcalf | 224/42.03 R X |
| 2,409,103 | 10/1946 | Cameron | 224/42.03 R |
| 2,779,524 | 1/1957 | Carlson | 224/42.08 |
| 2,907,483 | 10/1959 | Prag | 224/42.03 R X |
| 2,941,706 | 6/1960 | Slater | 224/42.08 |
| 3,273,767 | 9/1966 | Moore | 224/42.08 X |

*Primary Examiner*—Robert J. Spar
*Assistant Examiner*—Jerold M. Forsberg
*Attorney, Agent, or Firm*—Wells, St. John & Roberts

[57] ABSTRACT

A vehicle accessory frame for attachment of relatively large, heavy objects such as motorcycles, bicycles, luggage containers, and camping shelters to vehicles having an outwardly projecting bumper carried by exposed frame members and a ventilation grillwork elevationally spaced above the bumper composed of a set of upright elongated slots and an angularly disposed set of horizontal louvers located inwardly adjacent to the slots. The carrier frame comprises a load support means operatively connected to the vehicle bumper for carrying the major share of the accessory weight. An upper accessory bracket is provided to operatively anchor the accessory to the inner set of louvers of the vehicle grillwork. An impact absorbing means is also provided adjacent the upper accessory bracket for preventing undesirable movement of the accessory relative to the vehicle body. The accessory may be manually pivoted about an axis defined by a pivotable mounting means on the load support. The pivot axis is arranged so that the accessory may be pivoted away from the vehicle body while held on the load support means.

5 Claims, 6 Drawing Figures

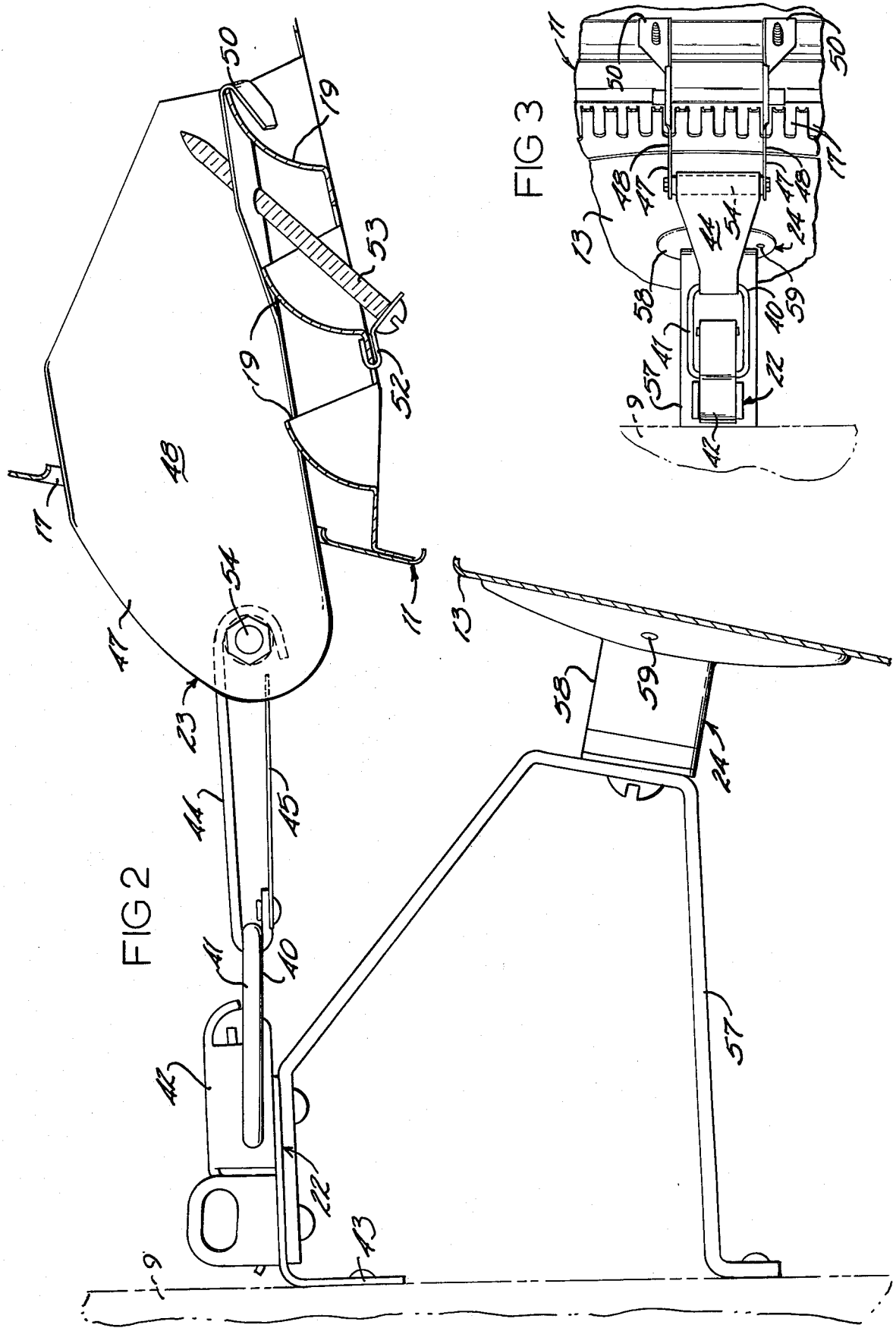

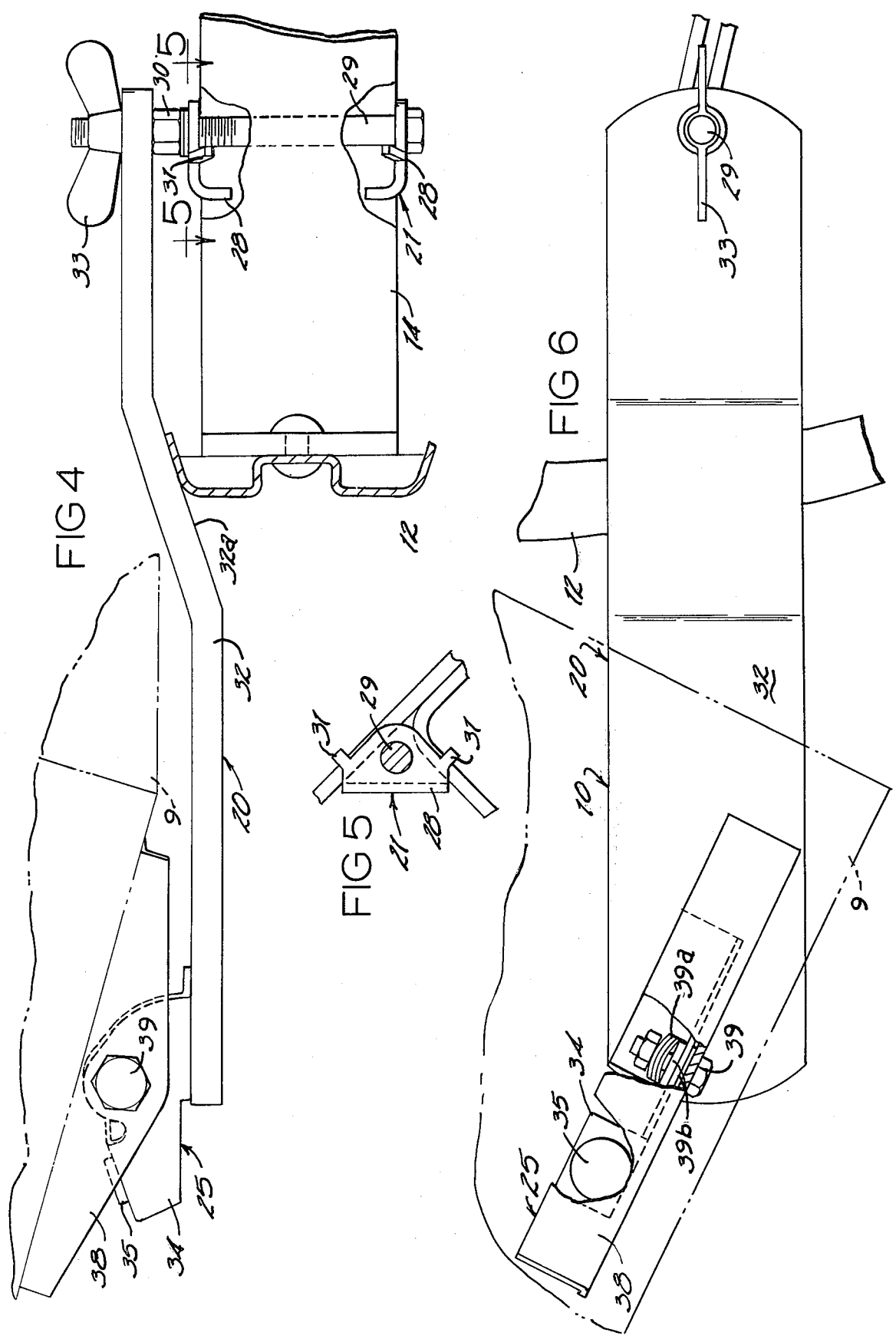

VEHICLE ACCESSORY CARRIER FRAME

BACKGROUND OF THE INVENTION

The present invention relates basically to exterior load carriers for attachment to vehicles and more particularly to such a carrier providing a unique means for supporting an accessory on the bumper of a vehicle without endangering the portions of the vehicle body adjacent to the accessory.

Conventional available accessory mounting systems are provided to enable the user to externally mount an accessory such as a motorbike, bicycle, luggage container, or camping shelter to a vehicle. Such available carrier devices usually mount to the vehicle bumper. Although vehicle bumpers are designed to support the weight of such accessories, the accessories themselves are often large and bulky and must also be attached to the vehicle at a location displaced from the vehicle bumper to provide stability.

It is at this displaced location that the primary difficulty in attaching an accessory occurs. Appropriate provisions are seldom made by the vehicle manufacturer for additional support or constraint for the accessory at such displaced locations. The vehicle operator is therefore often forced to utilize unsafe and impractical techniques for providing stability to an externally-carried accessory.

The frame of the present invention is designed to permit the full weight of an accessory to be applied to a vehicle bumper and the frame members associated therewith, with the upper portion of the accessory being releasably held to the vehicle body by a mechanism that provides very little vertical support, but prevents undesirable motion of the accessory relative to the vehicle body. The lower support includes provisions for allowing pivotal movement of the accessory away from the vehicle body to permit access to the adjacent trunk or engine compartment. The carrier frame is designed so that portions thereof may be permanently mounted to the vehicle without distracting from the normal outward appearance of the vehicle.

SUMMARY OF THE INVENTION

An exterior accessory carrier frame is described for vehicles of the type having a ventilation grillwork with a first set of upright elongated slots extending along an exterior body portion and a set of horizontally-elongated louvers spaced inwardly from the set of upright slots. The horizontally elongated louvers extend along a plane substantially perpendicular to the plane containing the upright slots. An upper accessory bracket is mounted to the accessory adjacent the ventilation grillwork when the accessory is carried on the load support means. A second fastening means is provided to releasably secure the upper accessory engaging bracket to the set of louvers. Impact-absorbing means is also provided between the accessory and vehicle to engage the vehicle at a prescribed location on its body to prevent undesirable movement of the accessory relative to the vehicle body.

It is a first object of our invention to provide an external accessory carrier frame that is relatively simple in construction and thereby easily installed and removed from applicable vehicles.

An additional object is to provide such a carrier frame that enables the principal amount of accessory weight to be carried on the vehicle bumper and associated vehicle framework.

A further object is to provide such a carrier frame that will transmit lateral forces or forces parallel to the ground supporting the vehicle, to a prescribed portion of the vehicle body.

A yet further object is to provide such a carrier frame that enables pivotal movement of the supported accessory to allow access to the adjacent engine or trunk compartment of the vehicle.

An additional object is to provide an exterior accessory carrier which provides strong anchorage to the interior louvers through the upright elongated ventilation slots and thereby prevents exterior damage of said slots.

These and other objects and advantages will become apparent upon reading the following disclosure, which, taken with the accompanying drawings, discloses a preferred form of our invention.

BRIEF DESCRIPTION OF THE DRAWINGS

A preferred form of the present invention is illustrated in the accompanying drawings in which:

FIG. 2 is a fragmentary detailed view of the upper accessory bracket and related elements with a portion of the vehicle also shown in section;

FIG. 3 is a fragmentary plan view of the upper accessory bracket and elements related thereto;

FIG. 4 is a side elevational view of the load support means mounted to a vehicle bumper and associated frame members;

FIG. 5 is a sectional view taken substantially along line 5—5 in FIG. 4; and

FIG. 6 is a plan view of the load support as shown in FIG. 4.

DETAILED DESCRIPTION OF A PREFERRED EMBODIMENT

Figure 1:
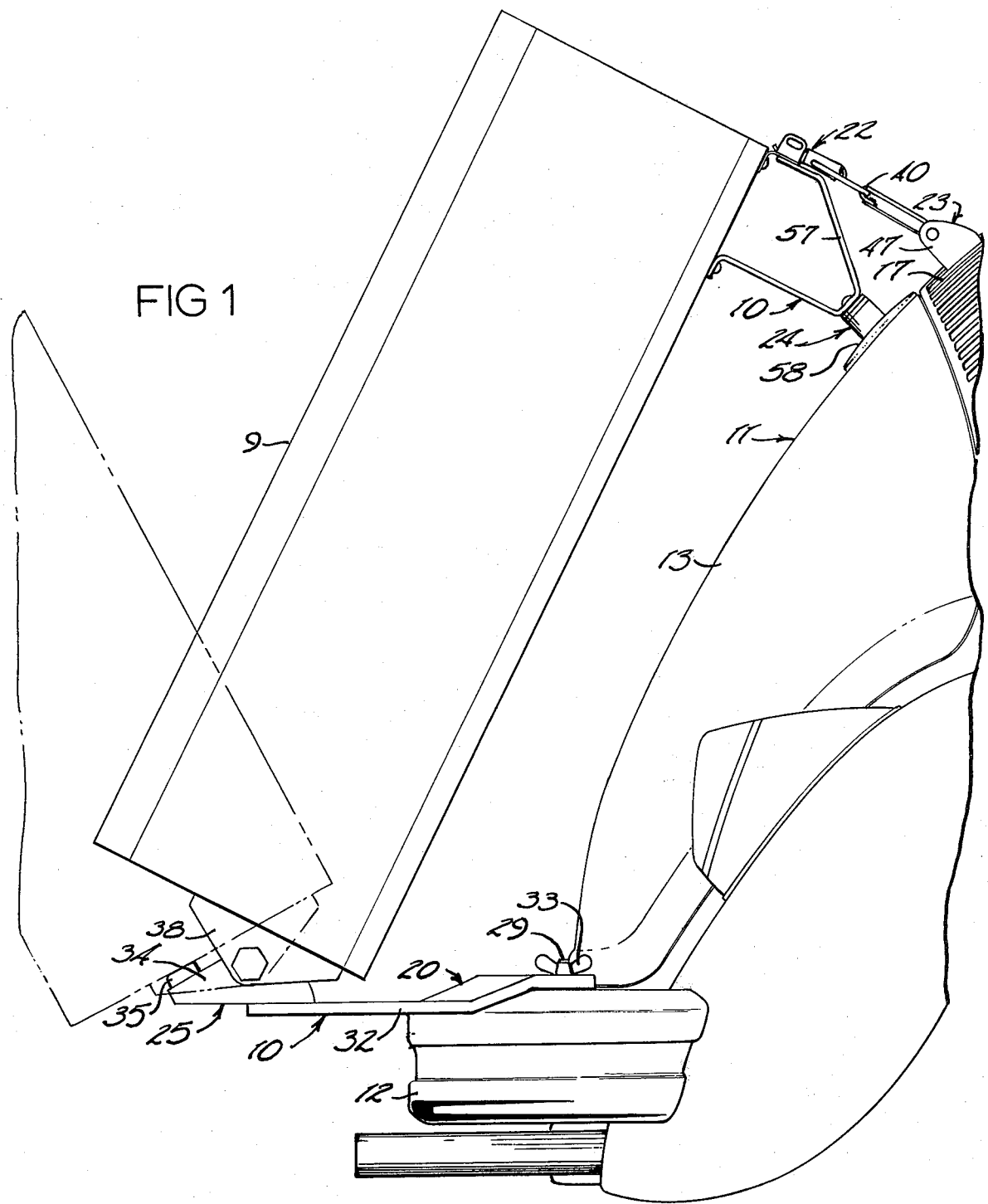
FIG. 1 is a fragmentary side elevational view of the present invention attached to the rear of a vehicle.

The present carrier frame is intended for use in carrying accessories such as motorcycles, bicycles, luggage containers, and camping shelters along the exterior of a vehicle body. Such an accessory is basically indicated in the drawing by the reference numeral 9. The accessory illustrated at 9 is particularly suitable for use with shelters such as that disclosed in our prior U.S. Pat. No. 3,763,607 granted on Oct. 9, 1973. Although the present carrier is particularly suitable for providing external support for such camp shelters, it is well understood that it may be utilized to provide adequate support for a wide variety of accessories or articles.

The carrier frame, generally designated in the drawings by the reference numeral 10, is adapted to be mounted to a vehicle 11 having an outwardly protruding bumper 12. The bumper 12 is supported on the vehicle body 13 by spaced exposed frame members 14. The vehicle body 13 includes a ventilation grillwork that is comprised of a plurality of upright elongated vent slots 17. Slots 17 allow passage of air through the exterior body section toward a set of horizontally elongated louvers 19 (FIG. 2). Louvers 19 are arranged along a plane that is substantially perpendicular to the plane of slots 17. These louvers play an essential role in the function of the present invention and will be discussed in greater detail below.

Referring to the elements comprising the present invention, the carrier frame is shown basically comprising a load support means 20 operatively mounted to the vehicle bumper 12 by a fastening means 21, an upper accessory bracket 22 mounted to the accessory 9 and positioned thereon to engage an anchor means 23, an impact absorbing means 24 located between the accessory and the vehicle body 13, and a pivotable mounting means 25 for carrying the accessory relative to the vehicle body.

Load support means 20 is basically comprised of an elongated support plate 32 held against bumper 12 by a fastening means 21. Fastening means 21 is comprised of a pair of elevationally spaced clamp members 28 held tightly together by means of a bolt 29 and nut 30 (FIG. 4). Support plate 32 is releasably attached to the bolt 29 by a wing nut 33. The support plate 32 extends outwardly over bumper 12 to provide support for accessory 9. Clamp members 28 include downwardly projecting flanges 31 that engage opposed surfaces on the frame members 14. Nut 30 is threadably engaged on bolt 29 to enable force to be applied to urge clamp members 28 toward one another and thereby anchor them securely against opposed surfaces of the frame members 14. As shown in FIG. 4, bolt 29 extends upwardly and includes an upwardly projecting end that extends beyond nut 30 to facilitate mounting of support plate 32 and to allow threadable engagement of wing nut 33.

Support plate 32, when engaged on bolt 29, extends outwardly from the vehicle and over bumper 12. It includes an angular surface 32a (FIG. 4) that is provided to insure engagement of the plate with at least a portion of the bumper 12. This arrangement provides a very stable support for the accessory since the weight of the accessory bears plate 32 down against the bumper and then upwardly against fastening means 21.

Again looking at FIG. 4, pivotable mounting means 25 is shown comprising a first bracket 34 on support plate 32 and a second bracket 38 mounted to accessory 9. The two brackets are connected for pivotal movement about the horizontal axis of a bolt 39. Pivotal movement of the accessory about the axis of bolt 39 is limited toward the vehicle body 13 by the support plate 32. Outward pivotal movement of the accessory is limited by a stop pad 35 provided on bracket 34. This position is shown by dashed lines in FIG. 1. Stop pad 35 is arranged on bracket 34 to enable the accessory to be pivoted clear of the vehicle body to permit access to the engine compartment or trunk usually located adjacent the vehicle bumper. Free pivotal movement of the accessory is inhibited through means of a plurality of friction-adjusting "Bellville" spring washers 39a that clamp the brackets 34 and 38 against friction pads 39b. This arrangement enables selective adjustment of the friction resistance to rotation of the accessory relative to support plate 32, and thereby permits plate 32 to carry the load at any specific angle within the limits of rotation described.

It should be noted that although only one load support means 20 is illustrated and described, it may be preferable that two or more be utilized in accordance to the weight and design of the accessory to be carried.

It may be further noted that the wing nut 33 enables easy removal of the support plate 32 when the carrier frame is not in use. Since the remainder of first fastening means 21 is substantially inboard of the bumper, it is barely visible and does not present an unsightly appearance. It may therefore be desirable to allow fastening means 21 to remain permanently on the vehicle regardless of usage of the carrier frame 10.

Upper accessory bracket 22 is comprised of a unidirectional force transmitting linkage 40 and an accessory mounting bracket 43. The accessory mounting bracket 43 is connected between the accessory and force transmitting linkage 40 as shown in FIG. 2. Bracket 43 may be adapted to receive substantially any named accessory to provide connection between said accessory and linkage 40. Linkage 40 is provided to prevent transmission of force inwardly toward the vehicle body from the accessory. Linkage 40 is comprised of a link 41 mounted to a toggle latch 42. A hook 44 and spring clip 45 are also included in the linkage and extends from link 41 to releasably engage a catch bar of anchor means 23. The loose association between link 41, hook 44, and catch bar 54 successfully prevents transfer of inwardly-directed forces that, for example, would be normally transferred to the vehicle body by the accessory upon a sudden stop. The linkage does however transmit outward forces through the linkage to anchor means 23.

Anchor means 23 is provided to present a secure connection between the accessory 9 and the vehicle 11. Anchor means 23 (FIG. 2) is comprised of a pair of clamp plates 47 extending through the vent slots 17 to engage the louvers 19. Clamp plates 47 include hooked portions 50 that are connected to louvers 19. A clip 52 and screw 53 are also provided to firmly secure the clamp plates 47 to the louvers 19. Clip 52 is provided to engage a forward edge of one louver opposite to the edge of a louver engaged by hook 50. Appropriate holes are provided in clip 52 and in clamp plates 47 to receive screw 53. As shown in FIG. 2, screw 53 is angularly oriented relative to the clip 52 and plate 47 so it may be utilized to apply a pulling force between the clip and hook 52, 50 to tightly hold them against louvers 19.

Clamp plates 47 are positioned relative to slots 17 and louvers 19 by first inserting the hooks 50 through a slot 17 with a planar surface 48 of clamp plate 47 substantially parallel to the vehicle body. The clamp plate is then rotated approximately 90° so the surface 48 is aligned substantially parallel to slot 17. This movement allows the further insertion of the hooked end 50 and enables it to be slipped over the upper edge of an appropriate louver 19.

As shown in FIG. 3, two clamp plates 47 are utilized and are identically mounted to the louvers 19. The catch bar 54 is mounted between the exposed ends of clamp plates 47 to enable engagement by hook 44.

It may be noted that substantially no force is applied to the relatively weak body metal that defines vent slots 17. All forces are applied to the inner louvers 19 which, because of their angular location relative to the upright slots 17, are more able to withstand outward pulling force than the vent slots 17.

Looking again at FIG. 2, impact absorbing means 24 is shown as mounted to the accessory 9 by a bracket 57 that projects forwardly from the accessory toward the vehicle body 13. A suction cup 58 is mounted to bracket 57 and extends therefrom to engage the vehicle body. Suction cup 58 is constructed of a resilient material and is a commonly utilized item for attachment to smooth surfaces. Suction cup 58 however, is provided with an aperture 59 extending through the exterior to the interior of the suction portion. Aperture 59 prevents a permanent seal between the suction cup and the vehicle body. The aperture is of sufficient size to enable transmittal of the forces to the vehicle body but allows only impact type forces of short duration away from the vehicle body. The aperture 59 provides a cancelling effect of the suction when the toggle latch 42 is released and the accessory is drawn away from the vehicle body.

It may be understood then that a strong overload force directed inwardly toward the vehicle body would be absorbed by the vehicle body adjacent to the suction cup 58. It is intended that this portion of the vehicle body be located on the vehicles' engine or truck lid, which will deflect in a springlike manner before becoming permanently distorted. An additional function of the suction cup 58 is to absorb some up and down impact forces such as those which may occur when the vehicle hits a bump.

The toggle latch 42 is located on fastening means 23 so that as it is moved to a closed position with hook 44 engaging catch bar 54, the suction cup 58 is drawn into engagement with and is somewhat deflected against the vehicle body. In this condition, a slight degree of tension is applied between the bracket 43 and louvers 19 to initially assist in stabilizing the accessory 9 presently held on the load support means 20.

It may have become obvious from the above description and attached drawings that various changes and modifications may be made therein without departing from the intended scope of this invention. Therefore, only the following claims are to be taken as definitions of our invention.

What we claim is:

1. An exterior accessory carrier frame for vehicles of the type having a vehicle body with a ventilation grillwork including a horizontally disposed set of upright elongated slots extending through the vehicle body and a set of horizontally elongated louvers spaced inwardly within the body from the set of upright slots, said louvers being formed along a plane substantially perpendicular to the set of upright slots, said accessory including a pivot mounting at its lower end for pivotal attachment of the accessory to the bumper so that the accessory extends substantially upright during transport but may be pivoted outwardly of the vehicle to permit access to and opening of the adjacent vehicle compartment, comprising:

a bracket assembly adapted to be mounted to the accessory at a location adjacent said set of upright slots when said accessory is supported by the carrier frame;

anchor means fixedly mounted to the horizontally elongated louvers and extending outwardly through said upright slots to releasably interengage said bracket assembly to retain the accessory in the transport condition;

and impact absorbing means extending from the bracket assembly on the accessory and engaging a prescribed location on the vehicle body for preventing undesired movement of the accessory relative to the vehicle body.

2. The mechanism set out in claim 1 wherein the bracket assembly is comprised of a unidirectional force transmitting linkage to transmit only outward pulling forces to the anchor means; and wherein the impact absorbing means is adapted to transmit all forces directed toward the vehicle body to said prescribed location on the vehicle body and impact forces of short duration directed away from the vehicle body to said prescribed location.

3. The mechanism set out in claim 2 wherein said impact absorbing means includes a resilient suction-cup-shaped member engageable with the vehicle body when said bracket assembly is engaged with said anchor means; and wherein the suction-cup-shaped member includes vent means for controlled release and intake of air between said suction member and vehicle body.

4. The mechanism set out in claim 1 wherein said anchor means comprises:

a clamp plate mounted to a first louver and extending outwardly therefrom through an appropriate slot of said set of upright elongated slots;

a catch bar mounted to an exposed exterior end of the clamp plate; and wherein said bracket assembly further includes a toggle latch mechanism having a hook member operatively connected thereto for selective engagement with said catch bar.

5. The mechanism set out in claim 4 wherein said clamp plate is fixed to said first louver by a screw clip assembly comprised of a clip mountable to a second louver outwardly adjacent to said first louver engaged by said clamp plate, and a screw threadably joining the clamp plate and said clip whereby said screw may be tightened to forceably secure the clamp plate to the louvers.

* * * * *